US009034287B2

(12) United States Patent
Gerlach et al.

(10) Patent No.: US 9,034,287 B2
(45) Date of Patent: May 19, 2015

(54) CATALYST COMPOSITIONS, ARTICLES, METHODS AND SYSTEMS

(71) Applicant: BASF Corporation, Florham Park, NJ (US)

(72) Inventors: Olga Gerlach, Ludwigshafen (DE); Andreas Sundermann, Bensheim (DE); Jeffrey B. Hoke, North Brunswick, NJ (US)

(73) Assignee: BASF CORPORATION, Florham Park, NJ (US)

( * ) Notice: Subject to any disclaimer, the term of this patent is extended or adjusted under 35 U.S.C. 154(b) by 0 days.

(21) Appl. No.: 14/205,049

(22) Filed: Mar. 11, 2014

(65) Prior Publication Data
US 2014/0271428 A1  Sep. 18, 2014

Related U.S. Application Data

(60) Provisional application No. 61/779,603, filed on Mar. 13, 2013.

(51) Int. Cl.
| | | |
|---|---|---|
| *B01D 29/74* | (2006.01) | |
| *B01D 53/94* | (2006.01) | |
| *B01J 29/74* | (2006.01) | |
| *B01J 23/42* | (2006.01) | |
| *B01J 23/44* | (2006.01) | |
| *B01J 29/70* | (2006.01) | |
| *B01J 35/02* | (2006.01) | |
| *B01J 35/04* | (2006.01) | |
| *B01J 35/08* | (2006.01) | |
| *B01J 37/02* | (2006.01) | |

(52) U.S. Cl.
CPC ........... *B01J 29/7415* (2013.01); *B01D 53/945* (2013.01); *B01J 23/42* (2013.01); *B01J 23/44* (2013.01); *B01J 29/7007* (2013.01); *B01J 35/023* (2013.01); *B01J 35/04* (2013.01); *B01J 35/08* (2013.01); *B01J 37/0215* (2013.01); *B01D 2255/102* (2013.01); *B01D 2255/2047* (2013.01); *B01D 2255/2063* (2013.01); *B01D 2255/2065* (2013.01); *B01D 2255/20707* (2013.01); *B01D 2255/2092* (2013.01); *B01D 2255/30* (2013.01); *B01D 2255/502* (2013.01); *B01D 2255/504* (2013.01); *B01D 2255/9202* (2013.01); *Y02T 10/22* (2013.01)

(58) Field of Classification Search
CPC ..... B01D 29/74; B01D 53/94; B01D 53/9445
USPC ........... 502/339, 439, 514; 423/213.5; 60/299
See application file for complete search history.

(56) References Cited

U.S. PATENT DOCUMENTS

| | | | |
|---|---|---|---|
| 6,685,900 B2 * | 2/2004 | Domesle et al. ........... | 423/213.5 |
| 7,332,454 B2 | 2/2008 | Dang et al. | |
| 7,576,031 B2 | 8/2009 | Beutel et al. | |
| 7,790,127 B1 | 9/2010 | Lee et al. | |
| 7,922,987 B2 | 4/2011 | Koegel et al. | |
| 2010/0189615 A1 | 7/2010 | Gramiccioni | |
| 2010/0290964 A1 | 11/2010 | Southward et al. | |
| 2012/0039775 A1 | 2/2012 | Schirmeister | |
| 2012/0053050 A1 | 3/2012 | Shiratori et al. | |
| 2012/0079817 A1 | 4/2012 | Wei et al. | |
| 2012/0131911 A1 | 5/2012 | Nakagawa et al. | |
| 2014/0161693 A1 * | 6/2014 | Brown et al. ................. | 423/212 |
| 2014/0170043 A1 * | 6/2014 | Hoke et al. ................. | 423/213.5 |

FOREIGN PATENT DOCUMENTS

| | | |
|---|---|---|
| CN | 101530787 | 9/2009 |
| EP | 2070581 | 6/2009 |
| JP | 10099691 | 4/1998 |
| WO | WO-2006109417 | 10/2006 |
| WO | WO-2007093325 | 8/2007 |
| WO | WO-2009120866 | 10/2009 |
| WO | WO-2012/059144 | 5/2012 |
| WO | WO-2014/068321 | 5/2014 |
| WO | WO-2014/093666 | 6/2014 |

OTHER PUBLICATIONS

A basic guide to particle chacterization inform white paper May 2, 2012 p. 1-26.
International Research Report Aug. 7, 2014.

* cited by examiner

*Primary Examiner* — Timothy Vanoy
(74) *Attorney, Agent, or Firm* — Melanie L. Brown

(57) ABSTRACT

Described are catalyst compositions, catalytic articles, exhaust gas treatment systems and methods that utilize the catalytic articles. The catalyst composition comprises a washcoat including a zeolite, refractory metal oxide support particles, and a platinum group metal supported on the refractory metal oxide support particles. Greater than 90% of the refractory metal oxide particles supporting PGM have a particle size greater than 1 μm and a $d_{50}$ less than 40 microns.

17 Claims, No Drawings

CATALYST COMPOSITIONS, ARTICLES, METHODS AND SYSTEMS

CROSS-REFERENCE TO RELATED APPLICATIONS

This application claims the benefit of priority under 35 U.S.C. §119(e) to U.S. Provisional Patent Application No. 61/779,603, filed on Mar. 13, 2013, which is hereby incorporated by reference in its entirety.

TECHNICAL FIELD

The present invention pertains to the field of catalyst compositions and catalytic articles for the abatement of pollutants from the exhaust gas of internal combustion engines. Specific embodiments are directed to catalytic compositions utilized for lean burn engines including a zeolite, refractory metal oxide support particles, and a platinum group metal supported on the refractory metal oxide particles.

BACKGROUND

Operation of lean burn engines, e.g., diesel engines and lean burn gasoline engines, provide the user with excellent fuel economy, due to their operation at high air/fuel ratios under fuel lean conditions. Diesel engines, in particular, also offer significant advantages over gasoline engines in terms of their durability, and their ability to generate high torque at low speed.

From the standpoint of emissions, however, diesel engines present problems more severe than their spark-ignition counterparts. Emission problems relate to particulate matter (PM), nitrogen oxides ($NO_x$), unburned hydrocarbons (HC) and carbon monoxide (CO). $NO_x$ is a term used to describe various chemical species of nitrogen oxides, including nitrogen monoxide (NO) and nitrogen dioxide ($NO_2$), among others.

Oxidation catalysts comprising a platinum group metal dispersed on a refractory metal oxide support are known for use in treating the exhaust of diesel engines in order to convert both hydrocarbon and carbon monoxide gaseous pollutants by catalyzing the oxidation of these pollutants to carbon dioxide and water. Such catalysts have been generally contained in units called diesel oxidation catalysts (DOC), or more simply catalytic converters, which are placed in the exhaust flow path from a diesel-powered engine to treat the exhaust before it vents to the atmosphere. Typically, the diesel oxidation catalysts are formed on ceramic or metallic substrate carriers (such as the flow-through monolith carrier) upon which one or more catalyst coating compositions are deposited. In addition to the conversions of gaseous HC, CO, and the SOF fraction of particulate matter, oxidation catalysts that contain platinum group metals (which are typically dispersed on a refractory oxide support) promote the oxidation of nitric oxide (NO) to $NO_2$.

Catalysts used to treat the exhaust of internal combustion engines are less effective during periods of relatively low temperature operation, such as the initial cold-start period of engine operation, because the engine exhaust is not at a temperature sufficiently high for efficient catalytic conversion of noxious components in the exhaust. To this end, an adsorbent material, which may be a molecular sieve, for example, a zeolite, may be provided as part of a catalytic treatment system in order to adsorb gaseous pollutants, usually hydrocarbons, and retain them during the initial cold-start period. As the exhaust gas temperature increases, the adsorbed hydrocarbons are driven from the adsorbent and subjected to catalytic treatment at the higher temperature.

One effective method to reduce $NO_x$ from the exhaust of lean-burn engines, such as gasoline direct injection and partial lean-burn engines, as well as from diesel engines, requires trapping and storing of $NO_x$ under lean burn engine operating conditions and reducing the trapped $NO_x$ under stoichiometric or rich engine operating conditions or lean engine operating with external fuel injected in the exhaust to induce rich conditions. The lean operating cycle is typically between 1 minute and 20 minutes and the rich operating cycle is typically short (1 to 10 seconds) to preserve as much fuel as possible. To enhance $NO_x$ conversion efficiency, the short and frequent regeneration is favored over long but less frequent regeneration. Thus, a lean $NO_x$ trap catalyst generally must provide a $NO_x$ trapping function and a three-way conversion function.

Some lean $NO_x$ trap (LNT) systems contain alkaline earth elements. For example, $NO_x$ sorbent components include alkaline earth metal oxides, such as oxides of Mg, Ca, Sr and Ba. Other lean LNT systems can contain rare earth metal oxides such as oxides of Ce, La, Pr and Nd. The $NO_x$ sorbents can be used in combination with platinum group metal catalysts such as platinum dispersed on an alumina support in the purification of exhaust gas from an internal combustion engine.

A conventional LNT typically contains basic sorbent components (e.g., $BaO/BaCO_3$ and/or $CeO_2$) for $NO_x$ storage and platinum group metals (PGM, i.e., Pt, Pd and Rh) for catalytic $NO_x$ oxidation and reduction. The LNT catalyst operates under cyclic lean (trapping mode) and rich (regeneration mode) exhaust conditions during which the engine out NO is converted to $N_2$ as shown in equations 1-6:

| | | |
|---|---|---|
| Lean condition: | $2 NO + O_2 \rightarrow 2 NO_2$ | (1) |
| (Trapping mode) | $4 NO_2 + 2 MCO_3 + O_2 \rightarrow 2 M(NO_3)_2 + 2 CO_2$ | (2) |
| Rich condition: | $M(NO_3)_2 + 2 CO \rightarrow MCO_3 + NO_2 + NO + CO_2$ | (3) |
| (Regeneration mode) | $NO_2 + CO \rightarrow NO + CO_2$ | (4) |
| | $2 NO + 2 CO \rightarrow N_2 + 2 CO_2$ | (5) |
| | $2 NO + 2 H_2 \rightarrow N_2 + 2 H_2O$ | (6) |

Molecular sieves such as zeolites are used in diesel oxidation catalyst (DOC) and, as noted above, in Lean $NO_x$ Trap (LNT) applications for the purpose of adsorbing hydrocarbons (HC) from the engine exhaust during startup of the vehicle when the catalyst is cold and unable to oxidize the hydrocarbons to $CO_2$ (cold start). When the temperature of the exhaust increases to the point when the platinum group metal in the catalyst becomes active, hydrocarbon is released from the molecular sieve and is subsequently oxidized to $CO_2$.

There are numerous strategies and methods for combining zeolite and platinum group metal in a DOC or LNT catalyst formulation. For instance, molecular sieves can be combined in the same layer as the platinum group metal or separated into different layers. For DOC applications, Pt and Pd are frequently used platinum group metals for oxidation of carbon monoxide (CO) and hydrocarbons (HC) present in diesel engine exhaust. The choice of these active metals is due to a combination of performance (i.e. mixtures of Pt and Pd have improved performance when compared to Pt and Pd alone) and cost (i.e. the price of Pd is significantly less than that of Pt).

A frequently used zeolite in diesel applications for HC adsorption is Beta zeolite due to its high capacity for storage of hydrocarbons typically found in diesel exhaust. However, when beta zeolite available from most commercial suppliers is combined with Pt/Pd DOC catalyst in the same slurry and coating layer, CO oxidation performance of the catalyst is reduced significantly compared to that of Pt/Pd DOC catalyst without zeolite addition. Although HC performance is improved due to the HC storage function of the zeolite, the CO performance is reduced due to a negative interaction between the Pt/Pd/alumina catalyst and zeolite. One method to avoid this negative interaction is to separate the Pt/Pd and zeolite into different coating layers. However, it is desirable for simplicity of slurry preparation and monolith coating to combine the Pt/Pd and zeolite in a single slurry and/or coating layer. In order to accomplish this, a new method for overcoming the negative interaction between Pt/Pd and zeolite on CO oxidation performance must be found.

SUMMARY

Embodiments of a first aspect of the invention are directed to a catalyst composition. In one or more embodiments, the catalyst composition comprises a washcoat including a zeolite, refractory metal oxide support particles, and a platinum group metal supported on the refractory metal oxide support particles. According to one or more embodiments, greater than 90% of the refractory metal oxide particles supporting PGM have a particle size greater than 1 μm and a $d_{50}$ less than 40 microns.

In specific embodiments, greater than 95% of the refractory metal oxide particles supporting PGM have a particle size greater than 1 μm and a $d_{50}$ less than 60 microns. In a more specific embodiment, greater than 98% of the refractory metal oxide particles supporting PGM have a particle size greater than 1 μm and a $d_{50}$ less than 40 microns.

In one or more embodiments, refractory metal oxide support particles are selected from alumina, silica-alumina, titania, titania-alumina, silica-titania, ceria-alumina, ceria-silica-alumina, manganese-alumina, and lanthana-alumina. In specific embodiments, the refractory metal oxide support particles are selected from alumina and silica-alumina.

According to one or more embodiments, the CO light-off temperature of the catalyst composition after aging at 800° C. is at least 3° C. less than the light-off temperature of a comparative catalyst composition comprising refractory metal oxide support particles and a platinum group metal supported on the refractory metal oxide support particles, wherein less than 90% of the refractory metal oxide support particles of the comparative catalyst composition supporting PGM have a particle size greater than 1 μm.

In one or more embodiments, the CO light-off temperature of the catalyst composition after aging at 800° C. is at least 5° C. less than the light-off temperature of a comparative catalyst composition comprising refractory metal oxide support particle and a platinum group metal supported on the refractory metal oxide support particles, wherein less than 90% of the refractory metal oxide support particles of the comparative catalyst composition supporting PGM have a particle size greater than 1 p.m.

In a specific embodiment, the CO light-off temperature of the catalyst composition after aging at 800° C. is at least 7° C. less than the light-off temperature of a comparative catalyst composition comprising refractory metal oxide support particles and a platinum group metal supported on the refractory metal oxide support particles, wherein less than 90% of the refractory metal oxide support particles of the comparative catalyst composition supporting PGM have a particle size greater than 1 μm.

In one or more embodiments, the platinum group metal comprises platinum, palladium, or mixtures thereof.

In one or more embodiments, the zeolite is selected from the group consisting of faujasite, chabazite, clinoptilolite, mordenite, silicalite, zeolite X, zeolite Y, ultrastable zeolite Y, ZSM-5, ZSM-12, SSZ-13, SAPO-5, SAPO-37, offretite, Beta zeolite, and combinations thereof. In specific embodiments, the zeolite is Beta zeolite. In a very specific embodiment, the zeolite has a particle size distribution that is monomodal.

A second aspect of the invention is directed to a catalytic article for the treatment of exhaust gas from an internal combustion engine containing hydrocarbons, carbon monoxide, and nitrogen oxides. In one or more embodiments the catalytic article comprises a carrier substrate having a length, an inlet end and outlet end, an oxidation catalyst material on the carrier. The oxidation catalyst material can include an oxidation catalyst comprising a washcoat layer including the catalyst composition according to one or more embodiments.

In one or more embodiments, the catalytic article uses a single washcoat layer comprising zeolite, refractory metal oxide support particles and a platinum group metal supported on the refractory metal oxide support particles.

In one or more embodiments, the catalytic article uses multiple washcoat layers wherein at least one of the layers comprises zeolite, refractory metal oxide support particles and a platinum group metal supported on the refractory metal oxide support particles.

In a specific embodiment, the internal combustion engine is a lean burn engine.

A further aspect of the invention is directed to a method of treating exhaust gas from a lean burn engine containing hydrocarbons, carbon monoxide, and nitrogen oxides. In one or more embodiments, the method comprises flowing exhaust gas over a catalytic article according to one or more embodiments.

A still further embodiment of the invention is directed to a method of preparing a catalytic article including a zeolite, refractory metal oxide support particles, and a platinum group metal supported on the refractory metal oxide support particles, wherein greater than 90% of the refractory metal oxide particles supporting PGM have a particle size greater than 1 μm and a $d_{50}$ less than 40 microns. In one or more embodiments, the method comprises impregnating refractory metal oxide support particles with a platinum group metal, spray drying the refractory metal oxide particles supporting PGM to increase the particle size, creating a slurry of the spray dried refractory metal oxide particles supporting PGM, adding zeolite to the slurry to form a washcoat, and coating the washcoat on a substrate.

DETAILED DESCRIPTION

Before describing several exemplary embodiments of the invention, it is to be understood that the invention is not limited to the details of construction or process steps set forth in the following description. The invention is capable of other embodiments and of being practiced or being carried out in various ways.

Improved compatibility between Pt/Pd/alumina and zeolite in DOC applications can be achieved by utilizing zeolite with large crystallite or agglomerate size (e.g. >1 μm). Larger zeolite particle size reduces the total amount of exposed external zeolitic surface area and thereby minimizes contact with precious metal in catalyst slurry. Minimizing the contact of precious metal with zeolite improves the overall catalyst performance for CO oxidation (and, to a lesser extent, HC and NO oxidation). However, since most commercial zeolites have particle sizes (crystallite and/or agglomerate) less than 1 µm, minimizing the contact of zeolite with precious metal in a washcoat is a challenge.

Even in the case where large particle zeolite is used, however, precious metal that may be located on fine support particles has a significantly increased chance of coming into contact with zeolite. For example, alumina particles or crystallites less than 1 µm can easily coat the surface of larger zeolite particles and thereby provide a pathway for direct contact and subsequent migration of precious metal to zeolite. If precious metal has a strong affinity for these small support particles, then a large proportion of precious metal in the catalyst formulation may end up in direct proximity with zeolite. Such a situation may occur when a large particle size catalyst support previously impregnated with precious metal on its outer surface is subjected to milling to reduce the particle size in preparation for coating on a monolithic carrier. The outer surface of the support particle is abraded during the milling process, forming very fine particulates (e.g. <1 µm). Individual alumina crystallites less than 100 nm can even be released. The precious metal previously located on the outer surface of the large support particle is likewise redistributed to these much smaller particles where they are free to come in close proximity with zeolite. Thus, there is a need for minimizing the contact between zeolite and precious metal oxidation catalysts when combined in the same coating layer.

Embodiments of the invention, therefore, are directed to catalyst compositions and catalytic articles including zeolite, exhaust gas systems, and methods of abating pollutants from exhaust gases using such catalytic articles. The catalytic articles are effective to destroy HC, CO, and $NO_x$ from internal combustion engines.

According to embodiments of the invention, it has been discovered that modifications to the particle size of the refractory metal oxide precious metal support can substantially reduce the negative interaction between zeolite and platinum group metal oxidation catalysts when combined in the same coating layer. Specifically, the use of a refractory metal oxide support that is substantially free of fine particles supporting PGM has been found to improve performance of platinum group metal oxidation catalysts.

In a first aspect, one or more embodiments are directed to a catalyst composition comprising a washcoat including a zeolite, refractory metal oxide support particles, and a platinum group metal supported on the refractory metal oxide support particles, wherein greater than 95% of the refractory metal oxide particles supporting PGM have a particle size greater than 1 µm and a $d_{50}$ less than 40 microns.

With respect to the terms used in this disclosure, the following definitions are provided.

As used herein, the term "catalyst" refers to a material that promotes a reaction. As used herein, the phrase "catalyst composition" refers to a combination of two or more materials that promote a reaction, for example, a platinum group metal on a support and a zeolite in combination.

As used herein, the term "molecular sieves" refers to materials based on an extensive three-dimensional network of oxygen ions containing generally tetrahedral type sites and having a pore distribution. A zeolite is a specific example of a molecular sieve, further including silicon and usually aluminum. Although specific embodiments of the invention are directed to the use of Beta zeolite, the concept is also valid for other zeolite or micro-porous crystalline solid compositions, particularly those with large pore openings (e.g. ZSM-12, SAPO-37, etc.).

In one or more embodiments, the zeolite is selected from the group consisting of faujasite, chabazite, clinoptilolite, mordenite, silicalite, zeolite X, zeolite Y, ultrastable zeolite Y, ZSM-5, ZSM-12, SSZ-13, SAPO-5, SAPO-37, offretite, Beta zeolite, and combinations thereof. In specific embodiments, the zeolite comprises Beta zeolite. According to a specific embodiment, the zeolite can have a particle size distribution that is monomodal. In other specific embodiments, the zeolite has a particle size that is less than 1 µm. In still further specific embodiments, the zeolite has a particle size that is greater than 1 µm.

As used herein, the term "catalyst carrier" refers to a composite support that carries a specific composition and/or a catalytic species. For example, refractory metal oxide particles may be a carrier for platinum group metal catalytic species. The terms "support" and "refractory metal oxide support" refer to the underlying high surface area material (e.g., alumina, silica-alumina, etc.) upon which additional chemical compounds or elements are carried. Thus, a support may comprise silica-alumina particles and a catalyst carrier may comprise support particles of silica-alumina having platinum and optionally palladium dispersed on the support.

More specifically, a "support" in a catalyst carrier refers to a material that receives precious metals, stabilizers, promoters, binders, and the like through association, dispersion, impregnation, or other suitable methods. Useful high-surface area supports include one or more refractory oxides. These oxides include, for example, silica, alumina, titania, zirconia, ceria, and mixed oxide forms thereof such as silica-alumina, aluminosilicates (which may be amorphous or crystalline), alumina-zirconia, alumina-ceria, titanium-alumina, and zirconium-silicate. In one embodiment, the support is comprised of alumina. Alumina includes the members of the gamma, delta, theta or transitional aluminas, such as gamma and beta aluminas, and, if present, a minor amount of other refractory oxide, e.g., about up to 20 weight percent. High surface area refractory metal oxide supports refer to support particles having high external surface area, pores larger than 20 Å, and a wide pore distribution. High surface area refractory metal oxide supports, e.g., "gamma alumina" or "activated alumina," used with oxidation catalysts typically exhibit a BET surface area in excess of 60 square meters per gram ("$m^2/g$"), often up to about 200 $m^2/g$ or higher. "BET surface area" refers to the Brunauer, Emmett, Teller method for determining surface area by $N_2$ adsorption. As used herein, the term "activated alumina" refers to a high surface area phase of alumina, such as, but not limited to, gamma-alumina. Such activated alumina is usually a mixture of the gamma and delta phases of alumina, but may also contain substantial amounts of eta, kappa, and theta alumina phases. Refractory metal oxides other than activated alumina may be utilized as a carrier for at least some of the catalytic components in a given catalyst. For example, bulk ceria, zirconia, alpha-alumina and other materials are known for such use. Although many of these materials have a lower BET surface area than activated alumina, that disadvantage tends to be offset by the greater durability of the resulting catalyst or a beneficial interaction with precious metal deposited on the support.

Desirably, the support has a specific surface area of 60 to 350 $m^2/g$, and typically 90 to 250 $m^2/g$.

In one or more embodiments, the refractory metal oxide support is selected from alumina, silica-alumina, silica, titania, titania-alumina, ceria-alumina, ceria-silica-alumina, manganese-alumina, lanthana-alumina, and silica-titania. In a specific embodiment, the refractory metal oxide support particles are selected from alumina and silica-alumina.

According to one or more embodiments, the refractory metal oxide supporting PGM is substantially free of fine particles. As used herein, the phrase "substantially free of fine particles" means that 10% of the refractory metal oxide particles supporting PGM that are present in slurry and subsequently washcoated onto a monolithic substrate carrier are less than 1 μm. In one or more embodiments, 5% of the refractory metal oxide support particles are <1 μm. In a specific embodiment, 2% of the refractory metal oxide support particles are <1 μm. In a more specific embodiment, 1% of the refractory metal oxide support particles are <1 μm. According to one or more embodiments, the particle size of the refractory metal oxide particles supporting PGM after slurry preparation, which may include milling, has minimal fines less than 1 μm.

In one or more embodiments, greater than 90% of the refractory metal oxide particles supporting PGM have a particle size greater than 1 μm. In specific embodiments, greater than 95% of the refractory metal oxide particles supporting PGM have a particle size greater than 1 μm, and in more specific embodiments, greater than 98% of the refractory metal oxide particles supporting PGM have a particle size greater than 1 μm. Accordingly, in one or more embodiments, greater than 90% of the refractory metal oxide particles supporting PGM have a particle size greater than 1 μm, including 90%, 91%, 92%, 93%, 94%, 95%, 96%, 97%, 98%, 99%, or 100%.

According to one or more embodiments, the refractory metal oxide supporting PGM particle size has a $d_{50}$ less than 40 microns. In specific embodiments, the refractory metal oxide supporting PGM particle size has a $d_{50}$ less than 30 microns. In one or more embodiments the refractory metal oxide supporting PGM particles have a $d_{50}$ less than 40, 30, 20, or 10 microns.

As used herein, the term "particle size" refers to the diameter of the particle at its largest cross section. Particle size measurements are commonly performed using the laser light scattering technique in dilute aqueous slurry using equipment well known in the art (e.g. Sympatec Quixel Model HD23). Other methods available to those skilled in the art are direct synthesis and fractionation. According to one or more embodiments, the particle size of the support, or the particle size of the refractory metal oxide particles, refers to the particle size of the support particles containing or supporting PGM.

While measurement of the size of support particles is typically accomplished in slurry prior to washcoating of a monolithic substrate, identification of support particles dispersed within a coated catalyst composition can also be accomplished using various microscopy, chemical and image analysis techniques known to those skilled in the art. For example, cross sections of coated articles (e.g. coated monoliths) can be imaged by SEM (scanning electron microscopy) at the appropriate magnification to reveal support particles dispersed within the coating. Depending on the magnification used for the analysis, precious metal particles dispersed on the support particles can also be visualized. Composition of the individual support and PGM particles can be confirmed by spot analysis techniques such as EDS (Energy Dispersive Spectroscopy) or by well-known bulk analysis techniques such as XRD (X-ray Diffraction). Quantification of support particle size and number can be accomplished by straightforward measurement and counting. However, to simplify this process, particularly if the particles are smaller, sophisticated image analysis computer software programs can be utilized to calculate the number distribution of support particles within the coating at different particle sizes. While these are just a few of the techniques that can be used to quantify the size distribution of support particles within a catalyst washcoat, other techniques known in the art but not described here may be equally appropriate and can be utilized as needed.

In one or more embodiments, supports with a large number of fines can be agglomerated into larger particles by various methods, including, but not limited to, spray drying.

In one or more embodiments, the refractory metal oxide support comprises alumina that is substantially free of fine particles. Greater than 90% of the alumina particles supporting PGM have a particle size greater than 1 μm, and the alumina support particle size has a $d_{50}$ less than 40 microns.

In one or more embodiments, the refractory metal oxide support comprises silica-alumina that is substantially free of fine particles. Greater than 90% of the silica-alumina particles supporting PGM have a particle size greater than 1 μm, and the silica-alumina support particle size has a $d_{50}$ less than 40 microns.

As used herein, the term "platinum group metal" or "PGM" refers to one or more Group VIII chemical elements defined in the Periodic Table of Elements, including platinum (Pt), palladium (Pd), rhodium (Rh), osmium (Os), iridium (Ir), and ruthenium (Ru), and mixtures thereof. In one or more embodiments, the platinum group metal comprises platinum, palladium, or mixtures thereof. In specific embodiments, the platinum group metal consists essentially of platinum, palladium, and mixtures thereof.

According to one or more embodiments, the platinum group metal is supported on the refractory metal oxide support. In one or more embodiments, the PGM is not intentionally dispersed on the zeolite; however, as will be understood by the skilled artisan, during processing of slurries to form washcoats to be applied to substrates during the manufacture of a catalytic article, some amount of PGM will be supported on the zeolite particles.

In one or more embodiments, the catalyst compositions may comprise about 5 to 400 g/ft$^3$, for example 20-150 g/ft$^3$ of a PGM catalytic species. The catalyst composition deposited on the substrate is generally formed as a coated layer over most, if not all, of the surfaces of the substrate contacted. In specific embodiments, the loading on the refractory metal oxide support is from about 0.5 to about 6 g/in$^3$, more specifically from about 2 to about 5 g/in$^3$ and most specifically from about 2 to about 4 g/in$^3$.

Without intending to be bound by theory, it is thought that the refractory metal oxide support particles that are substantially free of fine particles prevent the platinum group metal supported thereon from negatively interacting with the zeolite because the precious metal is less likely to come in close proximity with the zeolite. Support particles or crystallites that are greater than 1 μm cannot easily coat the surface of larger zeolite particles. Thus, the pathway for direct contact and subsequent migration of precious metal to zeolite is minimized.

Specific embodiments are directed to the use of refractory metal oxide supports that are substantially free of fine particles for improved performance when combined with a zeolite and platinum group metals supported on the refractory metal oxide support in the manufacture of DOC, CSF, or LNT catalytic articles.

In a specific embodiment, platinum and palladium are supported on an alumina support wherein greater than 90% of the alumina support particles have a particle size greater than 1 μm and a $d_{50}$ less than 40 microns.

Specific embodiments of the invention are directed to eliminating the negative interaction between large pore molecular sieves, for example, Beta zeolite, and Pt/Pd oxidation catalysts when combined in the same coating layer by use of alumina and/or silica-alumina support particles wherein greater than 90% of the support particles have a particle size greater than 1 µm and a $d_{50}$ less than 40 microns.

To provide a catalyst composition comprising a washcoat including a zeolite, refractory metal oxide support particles, and a platinum group metal supported on the refractory metal oxide support particles, wherein greater than 90% of the refractory metal oxide particles have a particle size greater than 1 µm and a $d_{50}$ less than 40 microns, the support is first impregnated with a precious metal solution. After the impregnated support is slurried in water, and optionally milled, the resulting slurry is further subjected to spray drying to increase the support particle size. After re-dispersion of the spray dried powder in water, zeolite is added to the catalyst slurry.

As used herein, a "catalytic article" refers to a substrate having thereon a plurality of catalyst carriers or supports having catalytic species thereon. The catalytic article is an element in an exhaust gas treatment system that is used to promote a desired reaction. For example, a catalytic article may comprise a washcoat containing catalytic species on a substrate. According to one or more embodiments, the catalytic article comprises a substrate having a length, an inlet end and an outlet end, an oxidation catalyst material on the substrate, the oxidation catalyst material including a catalyst composition as described above. Typically the composition is in the form of washcoat. A catalytic article can include one or more washcoats on a substrate. In one or more embodiments, the catalytic article uses a single washcoat layer.

Typically, the catalyst material or catalyst composition can be deposited on a substrate to provide a desired amount of catalytic species on the substrate and form a catalytic article. The term "substrate" refers to the monolithic material onto which the catalyst carrier is placed, typically in the form of a washcoat containing a plurality of support particles having catalytic species thereon. A washcoat is formed by preparing a slurry containing a specified solids content (e.g., 20-50% by weight) of support particles in a liquid vehicle, which is then coated onto a substrate and dried to provide a washcoat layer.

As used herein, the term "washcoat" has its usual meaning in the art of a thin, adherent coating of a catalytic or other material applied to a substrate carrier material, such as a honeycomb-type carrier member, which is sufficiently porous to permit the passage of the gas stream being treated to the active catalytic components. Washcoats are disposed on substrate by applying a slurry, which is a mixture of solid particles and a liquid vehicle (typically an aqueous vehicle), to the substrate to form the washcoat. Once applied, the washcoat is typically dried and optionally calcined.

In one or more embodiments, the substrate is a ceramic or metal having a honeycomb structure. Any suitable substrate may be employed, such as a monolithic substrate of the type having fine, parallel gas flow passages extending therethrough from an inlet or an outlet face of the substrate such that passages are open to fluid flow therethrough. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such monolithic structures may contain from about 60 to about 900 or more gas inlet openings (i.e. cells) per square inch of cross section.

For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst carriers of embodiments of the present invention may also be metallic in nature and be composed of one or more metals or metal alloys. The metallic substrates may be employed in various shapes such as pellets, corrugated sheet or monolithic form. Specific examples of metallic substrates include the heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

The catalyst materials according to embodiments of the present invention can be applied to the substrate by any known means in the art. For example, the catalyst material can be formed into a washcoat, which can be applied by spray coating, powder coating, or brushing or dipping a surface into the catalyst material.

In one or more embodiments, the catalyst material is disposed on a honeycomb substrate.

According to one or more embodiments, the CO light-off temperature of the catalyst composition after aging at 800° C. is at least 3° C. less than the light off temperature of a comparative catalyst composition comprising refractory metal oxide support particles and a platinum group metal supported on the refractory metal oxide support, wherein less than 90% of the refractory metal oxide support particles of the comparative catalyst composition supporting PGM have a particle size greater than 1 µm.

In one or more embodiments, the CO light-off temperature of the catalyst composition after aging at 800° C. is at least 5° C. less than the light off temperature of a comparative catalyst composition comprising refractory metal oxide support particles and a platinum group metal supported on the refractory metal oxide support, wherein less than 90% of the refractory metal oxide support particles of the comparative catalyst composition supporting PGM have a particle size greater than 1 µm. In specific embodiments, the CO light-off temperature of the catalyst composition after aging at 750 C is at least 7° C. less than the light off temperature of a comparative catalyst composition comprising refractory metal oxide support particles and a platinum group metal supported on the refractory metal oxide support, wherein less than 90% of the refractory metal oxide support particles of the comparative catalyst composition supporting PGM have a particle size greater than 1 µm.

Thus, according to embodiments of the invention, the negative interaction between the zeolite and the platinum group metal is minimized when the zeolite and platinum group metal are combined in the same coating layer by use of refractory metal oxide support particles wherein greater than 90% of the refractory metal oxide support particles supporting PGM have a particle size that is greater than 1 µm and a $d_{50}$ less than 40 microns. In this way, the zeolite does not negatively interact with platinum group metal components adhered to small support particles contained in slurry used to prepare washcoated DOC or LNT catalysts.

In a second aspect of the present invention, the catalytic articles described herein may be used as part of an exhaust gas treatment system. Thus, if the refractory metal oxide support particles that are substantially free of fine particles are used as part of a LNT, a DOC or integrated LNTDOC catalytic article, the catalytic article can be used in an integrated emission treatment system comprising one or more additional components for the treatment of diesel exhaust gas emissions. For example, the emission treatment system may further comprise a soot filter component. The soot filter may be catalyzed for specific functions. If the catalytic article is a DOC, the filter is typically located downstream from the DOC. The LNT catalytic article may be located upstream or downstream from the filter.

In a specific embodiment, the soot filter is a catalyzed soot filter (CSF). The CSF can comprise a substrate coated with a washcoat layer containing one or more catalysts for burning off trapped soot and or oxidizing exhaust gas stream emissions. In general, the soot burning catalyst can be any known catalyst for combustion of soot. For example, the CSF can be coated with a one or more high surface area refractory oxides (e.g., alumina, silica, silica-alumina, zirconia, and zirconia-alumina) and/or an oxidation catalyst (e.g., a ceria-zirconia) for the combustion of unburned hydrocarbons and to some degree particulate matter. However, preferably the soot burning catalyst is an oxidation catalyst comprising one or more platinum group metal (PGM) catalysts (platinum, palladium, and/or rhodium). In one or more embodiments, the refractory metal oxide support particles that are substantially free of fine particles supporting PGM are used to form a CSF where a PGM and zeolite is utilized.

In general, any known filter substrate in the art can be used, including, e.g., a honeycomb wall flow filter, wound or packed fiber filter, open-cell foam, sintered metal filter, etc., with wall flow filters being specifically exemplified. Wall flow substrates useful for supporting the CSF compositions have a plurality of fine, substantially parallel gas flow passages extending along the longitudinal axis of the substrate. Typically, each passage is blocked at one end of the substrate body, with alternate passages blocked at opposite end-faces. Such monolithic carriers may contain up to about 700 or more flow passages (or "cells") per square inch of cross section, although far fewer may be used. For example, the carrier may have from about 7 to 600, more usually from about 100 to 400, cells per square inch ("cpsi"). The cells can have cross sections that are rectangular, square, circular, oval, triangular, hexagonal, or are of other polygonal shapes. Wall flow substrates typically have a wall thickness between 0.002 and 0.1 inches. Specific wall flow substrates have a wall thickness of between 0.002 and 0.015 inches.

The porous wall flow filter used in embodiments of the invention is optionally catalyzed in that the wall of said element has thereon or contained therein one or more catalytic materials, such CSF catalyst compositions are described hereinabove. Catalytic materials may be present on the inlet side of the element wall alone, the outlet side alone, both the inlet and outlet sides, or the wall itself may consist all, or in part, of the catalytic material. In another embodiment, this invention may include the use of one or more washcoat layers of catalytic materials and combinations of one or more washcoat layers of catalytic materials on the inlet and/or outlet walls of the element.

It will be appreciated that an LNT will include components in addition to the platinum group metal on a refractory metal oxide particle and a zeolite. Typically, an LNT will further comprise ceria particles having an alkaline earth such as barium supported on the cerium.

Embodiments of a further aspect of the present invention are directed to a method of treating exhaust gas. The exhaust gas can comprise $NO_R$, ammonia, and/or urea. The method comprises contacting the exhaust gas with a catalyst composition comprising a washcoat including a zeolite, refractory metal oxide support particles, and a platinum group metal supported on the refractory metal oxide support particles, wherein greater than 90% of the refractory metal oxide particles have a particle size greater than 1 μm and a $d_{50}$ less than 40 microns. In specific embodiments, the internal combustion engine is a lean burn engine as defined above.

To treat a gaseous exhaust stream of an engine, the exhaust stream, including hydrocarbons, carbon monoxide, nitrogen oxide, and other gas components, is contacted with the catalytic article of the present invention. The catalytic article can simultaneously catalyze the oxidation of hydrocarbons and/or carbon monoxide and the reduction of nitrogen oxides present in a gaseous exhaust stream.

Embodiments of yet a further aspect of the present invention are directed to a method of preparing a catalytic article including a zeolite, refractory metal oxide support particles, and a platinum group metal supported on the refractory metal oxide support particles, wherein greater than 90% of the refractory metal oxide support particles supporting PGM have a particle size greater than 1 μm and a $d_{50}$ less than 40 microns. According to one or more embodiments, the method comprises impregnating refractory metal oxide support particles with a platinum group metal, spray drying the refractory metal oxide particles supporting PGM to increase the particle size, creating a slurry of the spray dried refractory metal oxide particles supporting PGM, adding zeolite to the slurry to form a washcoat, and coating the washcoat on a substrate. Without intending to be bound by theory, it is thought that spray drying results in the formation of large particles supporting PGM that are substantially free of fine particles. As used herein, the term "spray drying" refers to a method of producing a dry powder from a liquid or slurry by rapidly drying with a hot gas.

The use of the terms "a" and "an" and "the" and similar references in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments. The order of description of the above method should not be considered limiting, and methods may use the described operations out of order or with omissions or additions.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

The following non-limiting examples demonstrate the principles of embodiments of the present invention based on an exemplary zeolite material, Beta zeolite.

Example 1

Comparative Catalyst A

Silica-alumina support from a commercial supplier nominally comprising 5% silica and having a BET surface area of 180 m$^2$/g, an internal pore volume of 0.70 cc/g, and a particle size distribution wherein 11% of the particles were <1 um (d10=0.95 um, d50=2 um, and d90=4 um) was impregnated with palladium nitrate solution using standard incipient wetness techniques. After dispersing the impregnated powder in deionized water, Pt "A" solution was added. Subsequently, the pH of the resulting slurry was adjusted to 4 with addition of acid. The slurry was dried on a rotary evaporator, and the resulting powder was calcined at 590° C. for 30 min in air. The calcined powder was dispersed in water, acid was added to adjust pH=4 and the resulting slurry was milled to a particle size 90% less than ca. 20 um using methods known in the art. H-Beta zeolite having a silica-to-alumina ratio (SAR) of about 100:1 was then added. After stirring for 3 days, the slurry was dried under stirring and the resulting powder was calcined at 450° C. in air for 2 h. Total Pt loading on the silica-alumina support was 2.4% and total Pd loading was 1.2% (Pt/Pd weight ratio=2:1). The weight ratio of silica-alumina to zeolite was 3:1.

Example 2

Comparative Catalyst B

Silica-alumina support from a commercial supplier nominally comprising 5% silica and having a BET surface area of 180 m$^2$/g, an internal pore volume of 0.70 cc/g, and a particle size distribution wherein 11% of the particles were <1 um (d10=0.95 um, d50=2 um, and d90=4 um) was impregnated with palladium nitrate solution using standard incipient wetness techniques. After addition of barium hydroxide (1% barium based on support solids) the impregnated powder was dispersed in deionized water and Pt "A" solution was added. Subsequently, the pH of the resulting slurry was adjusted to 4 with addition of acid. The slurry was dried on a rotary evaporator, and the resulting powder was calcined at 590° C. for 30 min in air. The calcined powder was dispersed in water, acid was added to adjust pH=4, and the resulting slurry was milled to a particle size 90% less than ca. 20 um using methods known in the art. H-Beta zeolite having a silica-to-alumina ratio (SAR) of about 100:1 was then added. After stirring for 3 days, the slurry was dried under stirring and the resulting powder was calcined at 450° C. in air for 2 h. Total Pt loading on the silica-alumina support was 2.4% and total Pd loading was 1.2% (Pt/Pd weight ratio=2:1). The weight ratio of silica-alumina to zeolite was 3:1.

Example 3

Catalyst C

Silica-alumina support from a commercial supplier nominally comprising 5% silica and having a BET surface area of 180 m$^2$/g, an internal pore volume of 0.70 cc/g, and a particle size distribution wherein 11% of the particles were <1 um (d10=0.95 um, d50=2 um, and d90=4 um) was impregnated with palladium nitrate solution using standard incipient wetness techniques. After dispersing the impregnated powder in deionized water, Pt "A" solution was added. The resulting mixture was subjected to spray drying to increase the alumina support particle size. After calcination at 590° C. for 30 min in air, the resulting powder had a particle size distribution wherein 2.5% of the particles were <1 μm ($d_{10}$=2.0 μm, $d_{50}$=7.8 μm, and $d_{90}$=25.0). This powder was added to water and subjected to light milling in the absence of acid in order to break up any large spray dried agglomerates but not substantially reduce the particle size. The slurry pH was reduced to 4 with addition of acid, and H-Beta zeolite having an SAR of about 100:1 was added. After stirring for 3 days, the slurry was dried under stirring, and the resulting powder was calcined at 450° C. in air for 2 h. Total Pt loading on the silica-alumina support was 2.4% and total Pd loading was 1.2% (Pt/Pd weight ratio=2:1). The weight ratio of silica-alumina to zeolite was 3:1.

Example 4

Catalyst D

Silica-alumina support from a commercial supplier nominally comprising 5% silica and having a BET surface area of 180 m$^2$/g, an internal pore volume of 0.70 cc/g, and a particle size distribution wherein 11% of the particles were <1 um (d10=0.95 um, d50=2 um, and d90=4 um) was impregnated with palladium nitrate solution using standard incipient wetness techniques. After addition of barium hydroxide (1% barium based on support solids), the impregnated powder was dispersed in deionized water and Pt "A" solution was added. The resulting mixture was subjected to spray drying to increase the alumina support particle size as described in Example 3. After calcination at 590° C. for 30 min in air, the resulting powder was added to water and subjected to light milling in the absence of acid in order to break up any large spray dried agglomerates but not substantially reduce the particle size. The slurry pH was reduced to 4 with addition of acid, and H-Beta zeolite having an SAR of about 100:1 was added. After stirring for 3 days, the slurry was dried on a rotary evaporator, and the resulting powder was calcined at 450° C. in air for 2 h. Total Pt loading on the silica-alumina support was 2.4% and total Pd loading was 1.2% (Pt/Pd weight ratio=2:1). The weight ratio of silica-alumina to zeolite was 3:1.

Example 5

Comparative Catalyst E

Catalyst E was prepared identically to Example 1 except that H-Beta zeolite obtained from a commercial supplier and with a silica-to-alumina ratio of at least 400:1 was used instead of the lower SAR Beta zeolite used in Examples 1-4.

Example 6

Comparative Catalyst F

Catalyst F was prepared identically to Example 2 except that H-Beta zeolite obtained from a commercial supplier and with a silica-to-alumina ratio of at least 400:1 was used instead of the lower SAR Beta zeolite used in Examples 1-4.

Example 7

Catalyst G

Catalyst G was prepared identically to Example 3 except that H-Beta zeolite obtained from a commercial supplier and with a silica-to-alumina ratio of at least 400:1 was used instead of the lower SAR Beta zeolite used in Examples 1-4.

Example 8

Catalyst H

Catalyst H was prepared identically to Example 4 except that H-Beta zeolite obtained from a commercial supplier and with a silica-to-alumina ratio of at least 400:1 was used instead of the lower Beta SAR zeolite used in Examples 1-4.
Results The catalyst powders of Examples 1-8 were crushed and sieved to a target fraction of 250-500 µm. The catalysts were then aged at 800° C. in an atmosphere of 10% $H_2O$ in air for 20 hours. The aged catalyst powders (133 mg of each) were then tested for CO, HC, and NO oxidation performance using a fully automated test rig having 48 parallel fixed bed reactors made from stainless steel with an inner diameter of 7 mm for each individual reactor. The catalysts were tested under steady-state operation at 120, 140, 160, 180, 200, 220, 250, and 300° C. by passing a gas mixture simulating diesel exhaust (1,500 ppm CO, 500 ppm $C_1$ HC, 100 ppm NO, 13% $O_2$, 10% $CO_2$, 5% $H_2O$ in $N_2$) through each reactor at each temperature for 4 min with a total flow of 45 L/h. Results for the lower silica to alumina ratio H-Beta zeolite are summarized in Table 1.

TABLE 1

CO Light-Off Temperatures (T50) for Pt/Pd Catalysts Prepared With ca. 100:1 SAR Beta Zeolite (° C.)

| | | |
|---|---|---|
| Example 1 (Comparative Catalyst A) | Without Ba | 180 |
| Example 2 (Comparative Catalyst B) | With Ba | 183 |
| Example 3 (Catalyst C) | Without Ba, spray dried | 177 |
| Example 4 (Catalyst D) | With Ba, spray dried | 176 |

Results for the higher silica to alumina ratio H-Beta zeolite are summarized in Table 2.

TABLE 2

CO Light-Off Temperatures (T50) for Pt/Pd Catalysts Prepared With >400:1 SAR Beta Zeolite (° C.)

| | | |
|---|---|---|
| Example 5 (Comparative Catalyst E) | Without Ba | 176 |
| Example 6 (Comparative Catalyst F) | With Ba | 175 |
| Example 7 (Catalyst G) | Without Ba, spray dried | 172 |
| Example 8 (Catalyst H) | With Ba, spray dried | 171 |

The results show that increasing the particle size of the catalyst support by spray drying lessened the negative impact of zeolite on the precious metal and improved CO oxidation performance of the washcoat powders. For the catalyst washcoat powders prepared with the lower SAR Beta zeolite, CO light-off temperature for the Comparative Catalyst powder A prepared without barium was 3° C. higher than the spray dried Catalyst powder C. Furthermore, CO light-off temperature for the Comparative Catalyst powder B prepared with barium was 6° C. higher than the spray dried catalyst powder D. For the catalyst powders prepared with the high SAR Beta zeolite, CO light-off temperature was 4° C. lower for the powders prepared according to embodiments of the invention compared to the comparative catalysts. For both high and low SAR Beta zeolites, an improvement in CO light-off performance was observed by using silica-alumina support that was spray dried.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as disclosed. Thus, it is intended that the present invention include modifications and variations that are within the scope of the appended claims and their equivalents.

What is claimed is:

1. A catalyst composition comprising a washcoat including a zeolite, refractory metal oxide support particles, and a platinum group metal supported on the refractory metal oxide support particles, wherein greater than 90% of the refractory metal oxide particles supporting PGM have a particle size greater than 1 µm and a $d_{50}$ less than 40 microns.

2. The catalyst composition of claim 1, wherein greater than 95% of the refractory metal oxide particles supporting PGM have a particle size greater than 1 µm and a $d_{50}$ less than 40 microns.

3. The catalyst composition of claim 2, where greater than 98% of the refractory metal oxide particles supporting PGM have a particle size greater than 1 µm and a $d_{50}$ less than 40 microns.

4. The catalyst composition of claim 1, wherein the refractory metal oxide support particles are selected from alumina, silica-alumina, titania, titania-alumina, silicatitania, ceria, ceria-alumina, ceria-silica-alumina, manganese-alumina, and lanthanaalumina.

5. The catalyst composition of claim 4, wherein the refractory metal oxide support particles are selected from alumina and silica-alumina.

6. The catalyst composition of claim 1, wherein the CO light-off temperature of the catalyst composition after aging at 800° C. is at least 3° C. less than the light-off temperature of a catalyst composition comprising refractory metal oxide support particles and a platinum group metal supported on the refractory metal oxide support particles, wherein less than 90% of the refractory metal oxide support particles of the comparative catalyst composition have a particle size greater than 1 µm.

7. The catalyst composition of claim 6, wherein the CO light-off temperature of the catalyst composition after aging at 800° C. is at least 5° C. less than the light-off temperature of a comparative catalyst composition comprising refractory metal oxide support particle and a platinum group metal supported on the refractory metal oxide support particles, wherein less than 90% of the refractory metal oxide support particles of the comparative catalyst composition have a particle size greater than 1 µm.

8. The catalyst composition of claim 7, wherein the CO light-off temperature of the catalyst composition after aging at 800° C. is at least 7° C. less than the light-off temperature of a comparative catalyst composition comprising refractory metal oxide support particles and a platinum group metal supported on the refractory metal oxide support particles, wherein less than 90% of the refractory metal oxide support particles of the comparative catalyst composition have a particle size greater than 1 μm.

9. The catalyst composition of claim 1, wherein the platinum group metal comprises platinum, palladium, or mixtures thereof.

10. The catalyst composition of claim 1, wherein the zeolite is selected from the group consisting of faujasite, chabazite, clinoptilolite, mordenite, silicalite, zeolite X, zeolite Y, ultrastable zeolite Y, ZSM-5, ZSM-12, SSZ-13, SAPO-5, SAPO-37, offretite, Beta zeolite, and combinations thereof.

11. The catalyst composition of claim 10, wherein the zeolite is Beta zeolite.

12. The catalyst composition of claim 10, wherein the zeolite has a particle size distribution that is monomodal.

13. A catalytic article for the treatment of exhaust gas from an internal combustion engine containing hydrocarbons, carbon monoxide, and nitrogen oxides, the catalytic article comprising a carrier substrate having a length, an inlet end and outlet end, an oxidation catalyst material on the carrier, the oxidation catalyst material including an oxidation catalyst comprising a washcoat layer including the catalyst composition of claim 1.

14. The catalytic article of claim 13, wherein the catalytic article uses a single washcoat layer.

15. The catalytic article of claim 13, wherein the internal combustion engine is a lean burn engine.

16. A method of treating exhaust gas from a lean burn engine containing hydrocarbons, carbon monoxide, and nitrogen oxides, the method comprising flowing the exhaust gas over the catalytic article of claim 13.

17. A method of preparing a catalytic article including a zeolite, refractory metal oxide support particles, and a platinum group metal supported on the refractory metal oxide support particles, wherein greater than 90% of the refractory metal oxide particles supporting PGM have a particle size greater than 1 μm and a $d_{50}$ less than 40 microns, the method comprising impregnating refractory metal oxide support particles with a platinum group metal, spray drying the refractory metal oxide particles supporting PGM to increase the particle size, creating a slurry of the spray dried refractory metal oxide particles supporting PGM, adding the zeolite to the slurry to form a washcoat, and coating the washcoat on a substrate.

* * * * *